United States Patent [19]
Takahashi et al.

[11] Patent Number: 5,829,155
[45] Date of Patent: Nov. 3, 1998

[54] MICROMETER

[75] Inventors: Seigo Takahashi; Masamichi Suzuki, both of Kawasaki; Masahiko Tachikake, Higashihiroshima, all of Japan

[73] Assignee: Mitutoyo Corporation, Kawasaki, Japan

[21] Appl. No.: 805,155

[22] Filed: Feb. 24, 1997

[30] Foreign Application Priority Data

Feb. 26, 1996 [JP] Japan ..................................... 8-037926

[51] Int. Cl.⁶ ...................................................... G01B 3/18
[52] U.S. Cl. ................................................ 33/813; 33/831
[58] Field of Search ............................ 33/707, 708, 712, 33/783, 784, 794, 799, 813, 814, 815, 816, 819, 831

[56] References Cited

U.S. PATENT DOCUMENTS

| | | | |
|---|---|---|---|
| 319,919 | 6/1885 | Moffitt | 33/814 |
| 797,745 | 8/1905 | Pitman | 33/815 |
| 3,667,127 | 6/1972 | Tsugami | 33/819 |
| 4,255,861 | 3/1981 | Nakata et al. | |
| 4,419,824 | 12/1983 | Oberhans | 33/813 |
| 4,553,330 | 11/1985 | Yamauchi et al. | |
| 4,578,868 | 4/1986 | Sasaki et al. | 33/819 |
| 5,433,016 | 7/1995 | Tachikake et al. | 33/820 |
| 5,495,677 | 3/1996 | Tachikake et al. | 33/784 |

FOREIGN PATENT DOCUMENTS

| | | |
|---|---|---|
| 0 646 764 A2 | 9/1994 | European Pat. Off. |
| 57-179701 | 11/1982 | Japan . |
| 59-112202 | 6/1984 | Japan . |
| 139481 | 3/1953 | Sweden ................................. 33/813 |
| 3432405 A1 | 3/1986 | Switzerland . |
| 1226037 | 3/1971 | United Kingdom . |
| 1313605 | 4/1973 | United Kingdom . |

*Primary Examiner*—G. Bradley Bennett
*Attorney, Agent, or Firm*—Oliff & Berridge, PLC

[57] ABSTRACT

A main scale graduation, an auxiliary scale graduation or the like provided in a conventional micrometer is omitted, and a thimble 71 is provided at a regular position in the axial direction of the spindle 61 through a sleeve 51 in a frame 1 to rotate about the axis of a spindle 61. Between the thimble 71 and the spindle 61, a rotation transfer means 81 for transferring the rotation of the thimble 71 to the spindle 61 and allowing the spindle 61 to displace in the axial direction of the spindle 61. As the rotation transfer means 81, a ratchet system 82 is used.

11 Claims, 6 Drawing Sheets

ROTATING DIRECTION

MICROMETER

BACKGROUND OF THE INVENTION

1. Field of the Invention

This invention relates to a digital readout type micrometer. More particularly, the invention relates to a micrometer having a spindle that is displaced in the axial direction during rotation that reduces cost and improves the operability of the micrometer.

2. Description of the Related Art

As compared with a mechanical graduation display type measuring instrument, measuring instruments having an electronic digital readout have become commonplace in the measuring instrument industry in view of the superior precision and ease of reading provided by the electronic digital readout.

As such, micrometers have incorporated a digital readout into the structure of the micrometer's body. The digital readout is integrated with a rotary encoder that is capable of reading the axial displacement of a spindle which rotates as a thimble is rotated.

A conventional micrometer of the digital readout type will be explained below with reference to FIG. 7.

Looking at FIG. 7, it can be seen that the main body includes a frame 7 having a substantially U-shape configuration. An anvil 2 is fixed on the inner face of a first end of the U-shaped frame 1, which corresponds the left side of FIG. 7. A spindle 21 is provided on the other end of the U-shaped frame 1. The spindle 21 moves toward and away from the anvil 2 when the spindle 21 is displaced in the axial direction. A digital readout 4, ON/OFF switch 5 and zeroing switch 6 are incorporated within the U-shaped frame 1. The digital readout 4 indicates the displacement of the spindle 21 in readable numerals. The power ON/OFF switch 5 turns the micrometer on and off. The zeroing switch 6 returns the displayed numerals on the digital readout 4 to zero.

A bearing cylinder 11 and retaining ring 12 are attached to the end of the U-shaped frame 1. The bearing cylinder 11 is fixed to the inner face of the end while holding the spindle 21. The retaining ring 12 is screwed onto the outer face. The central portion of the retaining ring 12 retains an end of an inner sleeve 13 and an outer sleeve 14. The outer sleeve 14 is mounted onto the inner sleeve 13 such that they form a double-cylinder structure. The inner sleeve 13 has a small-diameter tube portion 13A at an end nearest the frame 1 and a cylindrical shaped portion 13B at the end distant from the frame 1. The cylindrical shaped portion 13B is configured to expand in the radial direction by a plurality of (normally, three) slits 15 formed along the axial direction. A female screw portion 16 is formed along the inner face of the cylindrical shaped portion 13B in the axial direction. A male screw portion 18 is formed on the outer face of the cylindrical shaped portion 13B such that the male screw portion 18 can be screwed onto a taper nut 17. The female screw portion 16 is also shaped to be screwed onto the spindle 21.

The spindle 21 has a shaft portion 21A, a screw portion 21B and a taper portion 21C. The shaft portion 21A is slidably supported by the bearing cylinder 11. The screw portion 21B has a slightly larger diameter than the shaft portion 21A and is formed to receive the male screw portion 18 on the outer face thereof. The taper portion 21C is formed on the end of the screw portion 21B facing away from the frame 1. The shaft portion 21 A has a sectionally V-shaped groove 22 formed on the outer circumference and along the axial direction of the shaft portion 21A. The screw portion 21B is screwed onto the female screw portion 16. The taper portion 21C is inserted onto the screw portion 21B and secured thereon with a thimble 23 that covers the outer circumferential face of the outer sleeve 14. At the end of the thimble 23 away from the frame 1, a ratchet knob 24 turns freely when the spindle 21 receives more than a predetermined load. Therefore, provided that the thimble 23 or the ratchet knob 24 is turned, the spindle 21 is displaced in the axial direction while being turned. The amount of the axial displacement of the spindle 21 can be read out on a graduated main scale 25 that is formed along the axial direction of the outer circumference of the outer sleeve 14. The graduated main scale 25 must be calibrated regularly. A graduated auxiliary scale 26 is formed along the outer circumference of the thimble 23.

A rotational cylinder 31, a first spacer 32 and a second space 33 are provided on the outer circumferential face of the spindle 21 between the end of the small-diameter tube portion 13A nearest the frame 1 and the bearing cylinder 11. The rotational cylinder 31 and spacers 32 and 33 permit the spindle 21 to displace in the axial direction. In addition, as spring 34 is placed between the second spacer 33 and the bearing cylinder 11 to forcibly move the second spacer 33, the first spacer 32 and the rotational cylinder 31 axially toward the ratchet knob 24. The rotational cylinder 31 engages the screw 35 which has a projection 35A that slidably engages the V-shaped groove 22. This structure allows the rotational cylinder 31 and the spindle 21 to be rotated while synchronized with each other and as well as to enable the displacement of the spindle 21 in the axial direction.

A capacitance encoder 41 is provided between the small-diameter tube portion 13A of the inner sleeve 13 and the rotational cylinder 31. The capacitance encoder 41 detects the amount the spindle 21 is displaced in the axial direction from the degree the spindle 21 is rotated. The encoder 41 includes a fixed plate 43 adhesively attached to a plate 42 that is fixed to the retaining ring 12 and sending and output electrodes (not shown). The encoder 41 also includes a rotating plate 44 adhesively attached to the rotational cylinder 31 so the rotating plate 44 faces the fixed plate 43 with a fixed space between them and has a receiving electrode and an associated electrode (not shown). The encoder 41 receives a signal responding to a relative rotational angle between the fixed plate 43 and the rotating plate 44 from the output electrode when a signal having different phase is given to the sending electrode. Incidentally, the signal responding to the relative rotational angle between the fixed plate 43 and the rotating plate 44, which is detected by the encoder 41, is indicated on the digital readout 4 in directly readable numerals after it is processed in a circuit (not shown).

The aforementioned conventional digital readout type micrometer is structured so that the mechanical graduated display system can be used at the end of a life of the power supply (battery) which drives the digital readout 4, the encoder 41, the circuit and the like. More specifically, the conventional micrometer is structured to connect the outer sleeve 14 to the frame 1 and the thimble 23 to the spindle 21, in addition to forming the graduated main scale 25 along the axial direction on the outer circumferential face of the outer sleeve 14 as well as the graduated auxiliary scale 26 along the circumference of the thimble 23. As a result, the conventional micrometer provides the disadvantages of an intricate assembly and high cost.

Further, when measuring an object with a micrometer having the conventional structure, there is also the disadvantage that the operation becomes difficult when the spindle 21 is greatly displaced. For example, the ratchet knob 24 is gradually distanced from the frame 1 such that when a measured object is held with the left hand and the frame 1 is held with the right hand, the spindle 21 is displaced a distance from the anvil 2 while the ratchet knob 24 is turned with the thumb and the index finger of the right hand.

It is an object of the present invention to provide a micrometer capable of solving the aforementioned disadvantages by reducing cost and simplifying the operability.

SUMMARY OF THE INVENTION

A micrometer according to the present invention, includes a U-shaped frame having an anvil at a first end of the frame, a spindle that can be displaced in the axially direction with the screwed rotation that engages the second end of the frame body. An encoder detects the degree of displacement of the spindle in the axial direction from the degree the spindle is rotated. A digital readout indicates a measured value in directly readable numerals based on an output signal from the encoder. The micrometer also includes a thimble provided at a predetermined position in the axial direction of the spindle at the second end of the frame and rotates about the axis of the spindle. A rotation transfer means is provided between the thimble and the spindle and transfers the rotation of the thimble to the spindle and allows the displacement of the spindle in the axial direction.

According to the aforementioned structure, the graduated main scale and the graduated auxiliary scale discussed with regards to the conventional micrometer is omitted from the invention to reduce cost. Thus, the outer sleeve that forms the graduated main scale is not needed, so that the numbers of parts and processes can be decreased. Thus reducing cost.

In the measurement, provided that the thimble is rotated, the rotation of the thimble is transferred through the rotation transfer means to the spindle. The spindle is screwed to the main body, so that the spindle is displaced in the axial direction with the rotation of the thimble. Thereupon, the degree of displacement of the spindle is detected by the encoder, and then the digital readout indicates a measured value in directly readable numerals. At the time, although the spindle is displaced in a direction away from the anvil, the thimble is rotatably provided at a predetermined position on the frame, so that the thimble is not displaced with the spindle, thereby allowing a disadvantage of decreasing the operability, which is caused by the great displacement of the spindle, to be resolved.

In the micrometer structured as described above, the rotation transfer means can be structured to include a groove, formed along the axial direction on the outer circumferential face of the spindle, and a pin, slidably engaged in the groove to be projected to the inner face of the thimble. However, it is advisable to use, for example, a ratchet system that transfers the rotation of the thimble to the spindle and causes the thimble to rotate freely relative to the spindle when the spindle receives more than a predetermined load.

According to the structured as described above, when a measured subject is clamped between the spindle and the anvil, provided that more than a predetermined load acts on the spindle, the thimble turns freely relative to the spindle, so that the measurement can be carried out with a steady measuring pressure at all times. Therefore, the measurement can be insured with high-accuracy.

In the above case, it is advisable that the ratchet system includes a ratchet ring that is secured in the thimble and has a saw-tooth projection on the inner circumferential face thereof, and a plate spring that is inserted between the ratchet ring and the outer circumferential face of the spindle, in which one end of the plate spring is engaged in the groove formed along the axial direction of the spindle, and the other end is forcibly pressed to the saw-tooth projection of the ratchet ring.

According to the structure as described above, the ratchet system is provided between the thimble and the spindle, so that the structure is simple. Further, the ratchet system includes two parts, the ratchet ring and the plate spring, decreasing the number of parts and simplifying assembly, thereby reducing cost.

In the micrometer provided with the ratchet system having the ratchet ring and the plate spring, it is advisable that the thimble have a cylindrical body that is supported in the second end of the frame so the thimble can rotate about the axis of the spindle and accommodate the ratchet ring. A cap is screwed into the other end of the cylinder body covering the end of the spindle.

According to the structure as described above, when one end of the plate spring of the ratchet system is engaged in the groove formed along the axial direction of the spindle, the assembly can be carried out while looking through the hole of cylinder body, so that one end of the plate spring can be easily engaged in the groove of the spindle.

It is desirable that the cap has a slightly larger internal diameter than the outer diameter of the spindle and doubles as a stopper to be abutted to the end face of the plate spring when being screwed into the other end of the cylindrical body of the thimble.

According to the structure as described above, when the spindle is displaced in the axial direction, the plate spring tries to move in the axial direction with the spindle, but the cap interrupts this movement, thereby retaining the plate spring at its original position.

As a means for supporting the thimble to rotate about the axis of the spindle at a predetermined position in the axial direction of the spindle, a collar portion is provided at an end of the cylinder body, and may be rotatably retained to be covered from the outside by a cap nut engaged to the main body.

Further, although a capacitance encoder is used to detect the degree of displacement of the spindle in the axial direction from the degree the spindle is rotated, a barrier-layer type, a magnetic type or the like can also be used, however, it is preferred that the capacitance encoder be used. This is because the use of the capacitance encoder causes lower power consumption so that the micrometer can be used over an extended time period without replacement of the batteries.

In the above case, it is advisable for a structure of the encoder to include a fixed plate and a rotational plate. The fixed plate has a sending electrode and an output electrode secured in the frame. The rotational plate has a receiving electrode and an associated electrode and located on the spindle through a rotational cylinder to face the fixed plate with a fixed space therebetween. The encoder receives a signal responding to a relative rotational angle between the fixed plate and the rotational plate from the output electrode when a signal having different phase is given to the sending electrode. The rotational cylinder is screwed with a screw having a projection engaged to slide in the groove formed along the axial direction of the spindle, so that the rotational cylinder and the spindle are synchronistically rotated and the displacement of the spindle in the axial direction is allowed.

According to the structure as described above, the groove formed along the axial direction of the spindle can be doubled as the groove for engaging the plate spring composing the ratchet system, and the groove for rotating the rotational cylinder in synchronicity with the spindle.

DETAILED DESCRIPTION OF THE PREFERRED EMBODIMENTS

Figure 7:
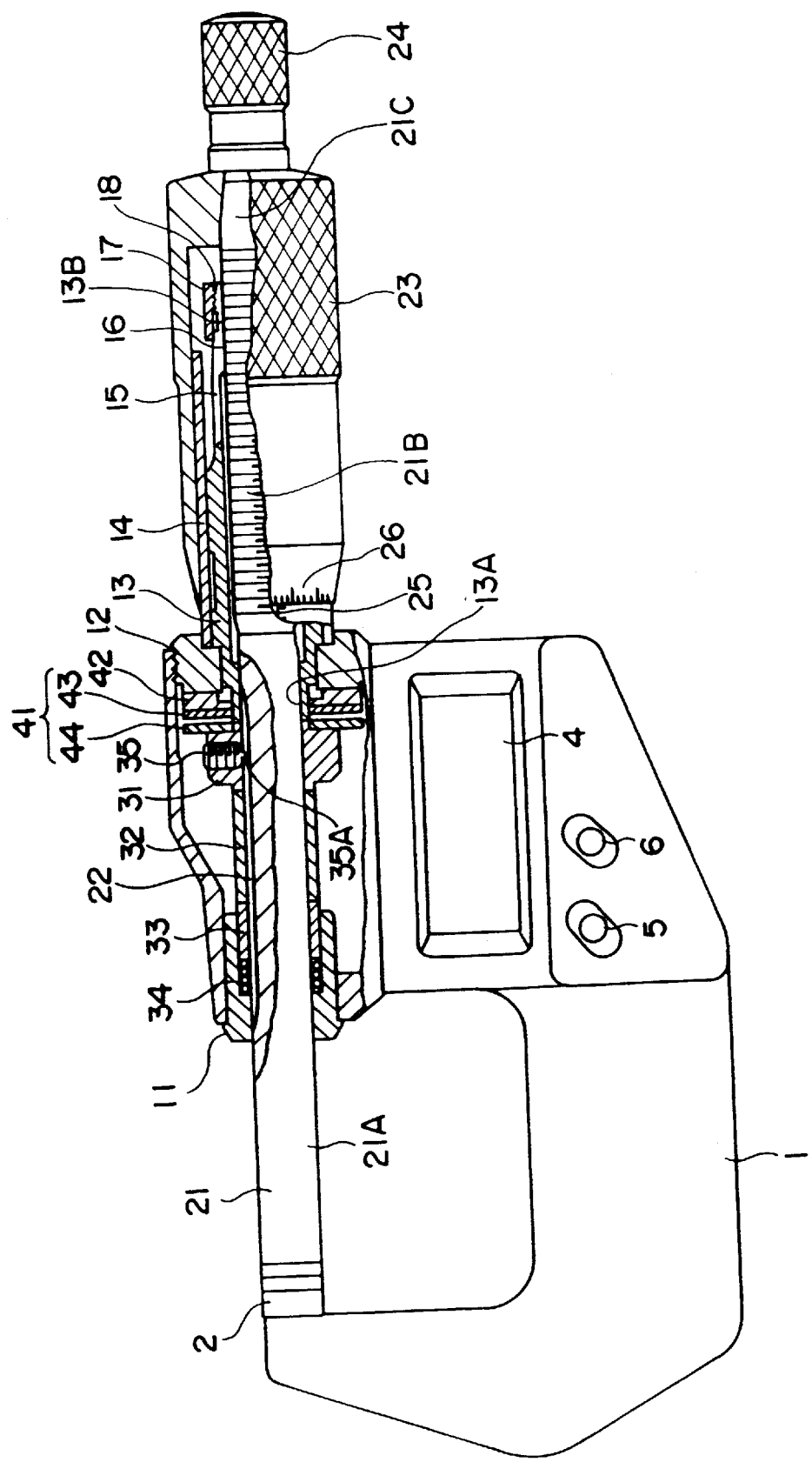
FIG. 7 is a partially cut front view showing a conventional digital readout type micrometer.

The preferred embodiment according to the present invention will be explained in detail below with reference to the attached drawings. Incidentally, in the following description, the same reference numerals will be used to designate the same or similar components as those in FIG. 7, so that the description will be omitted or simplified.

Figure 1:
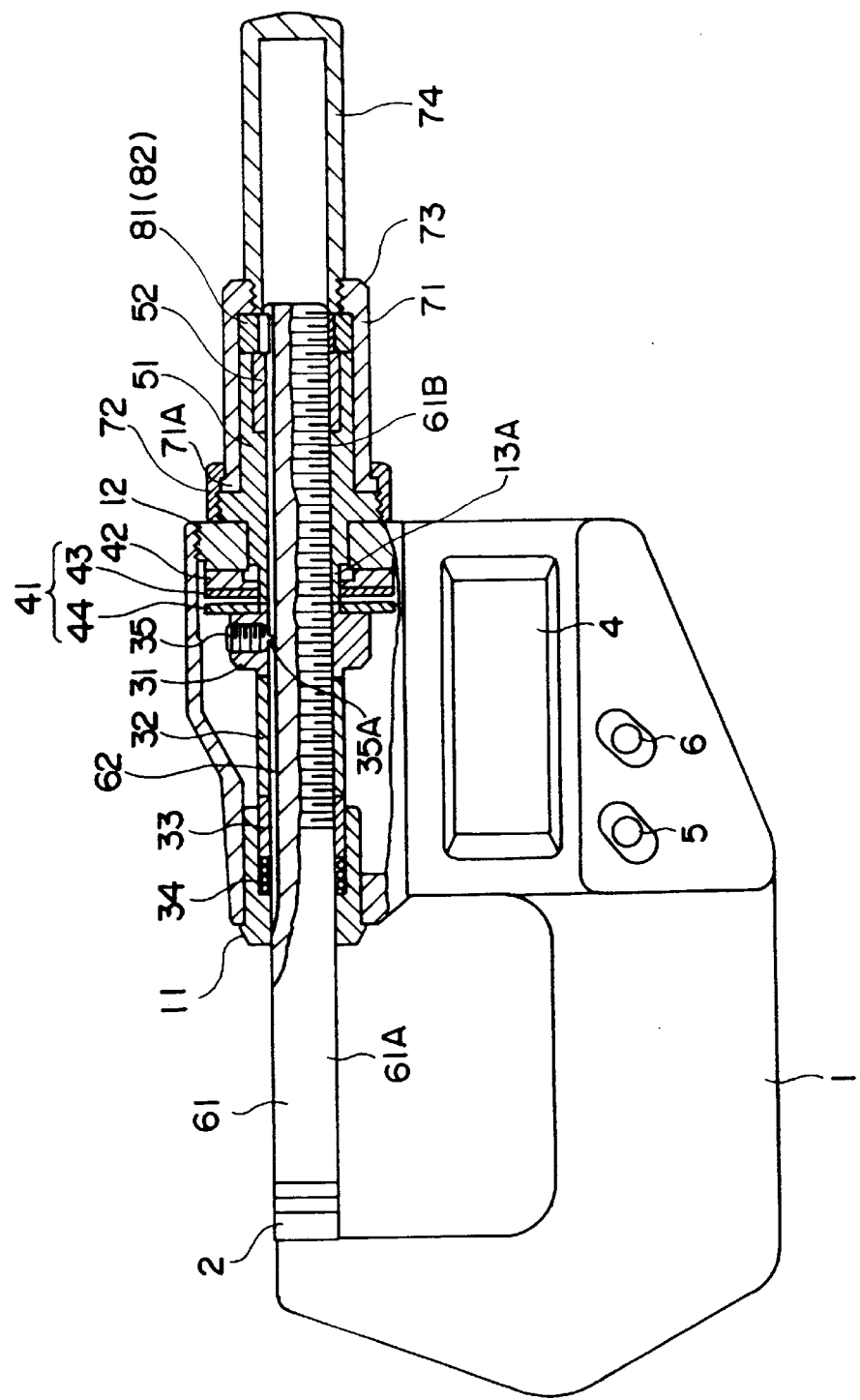
FIG. 1 is a partially cut front view showing the preferred embodiment of a micrometer according to the present invention.
Figure 2:
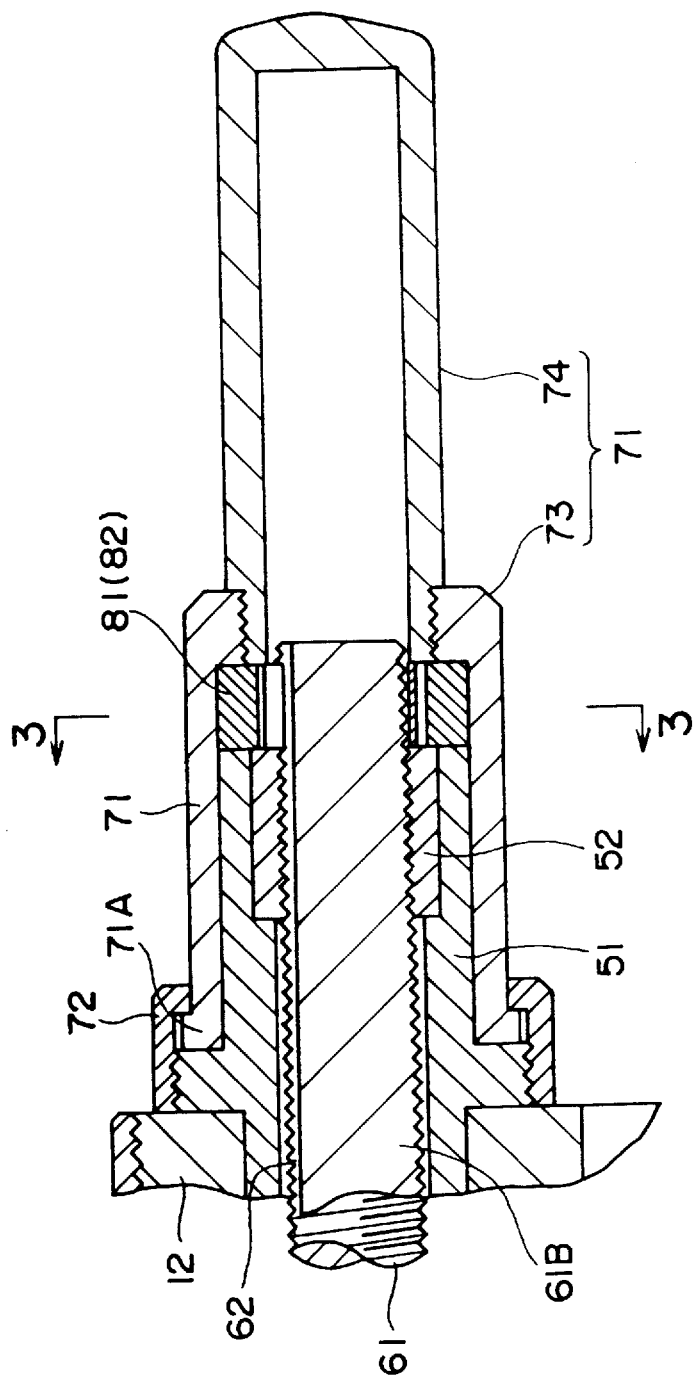
FIG. 2 is a fragmentary enlarged view of the aforementioned embodiment.

As shown in FIG. 1 and FIG. 2, in a micrometer of the preferred embodiment, the aforementioned outer sleeve 14 is omitted and a sleeve 51 shorter than the aforementioned inner sleeve 13 is retained in the aforementioned retaining ring 12. A nut member 52, formed with female screw on the inner face thereof, is pressed into the inner face of the sleeve 51 at an end remote from the retaining ring 12 so the nut member 52 can be secured thereon. The nut member 52 is then screwed onto the spindle 61.

The spindle 61 includes a shaft portion 61A and a screw portion 61B. The shaft portion 61A is slidably supported in the bearing cylinder 11. The screw portion 61B, having the same diameter as the shaft portion 61A and formed with a screw, engages the nut member 52 on the outer circumferential face of the screw portion 61B at an end remote from the anvil 2. A V-shaped groove 62 is formed along the axial length of the screw portion 61B. The groove 62 engages the projection 35A of the screw 35.

On the outer circumference of the sleeve 51, a tubular thimble 71, having a collar portion 71A at an end proximate the retaining ring 12, is provided to rotate about the axis of the spindle 61. A cap nut 72 is screwed onto the thimble 71 such that the nut 72 covers the collar portion 71A to retain the thimble 71 at a predetermined position in the axial direction. The thimble 71 has a cylindrical body 73 that is supported on the outer circumference of the sleeve 51 to rotate about the axis of the spindle 61, and a cap 74 that covers the end of the spindle 61 remote from the anvil 2 and is screwed into an open end of the cylindrical body 73 remote from the retaining ring 12. The internal diameter of the cap 74 is configured to be slightly larger than the outer diameter of the spindle 61. Also, the cap 74 acts as a stopper to be abutted to the end face of a plate spring 85 (mentioned below) when being screwed into the open end portion of the cylindrical body 73.

A rotation transfer means 81 is provided between the thimble 71 and the spindle 61. The rotation transfer means 81 transfers the rotation of the thimble 71 to the spindle 61 and allows the spindle 61 to be displaced in the axial direction. The rotation transfer means 81 uses a ratchet system 82 to transfer the rotation of the thimble 71 to the spindle 61 and causes the thimble 71 to turn free relative to the spindle 61 when the spindle 61 receives more than a predetermined load.

Figure 3:
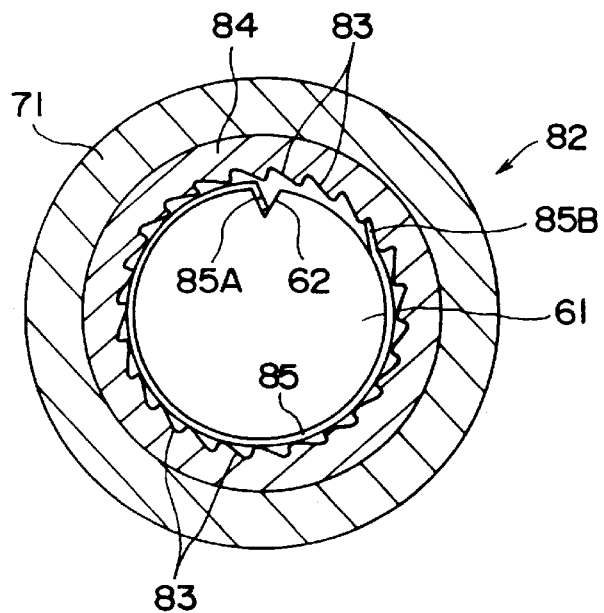
FIG. 3 is a sectional view taken along the 3—3 line in FIG. 2.
Figure 4:
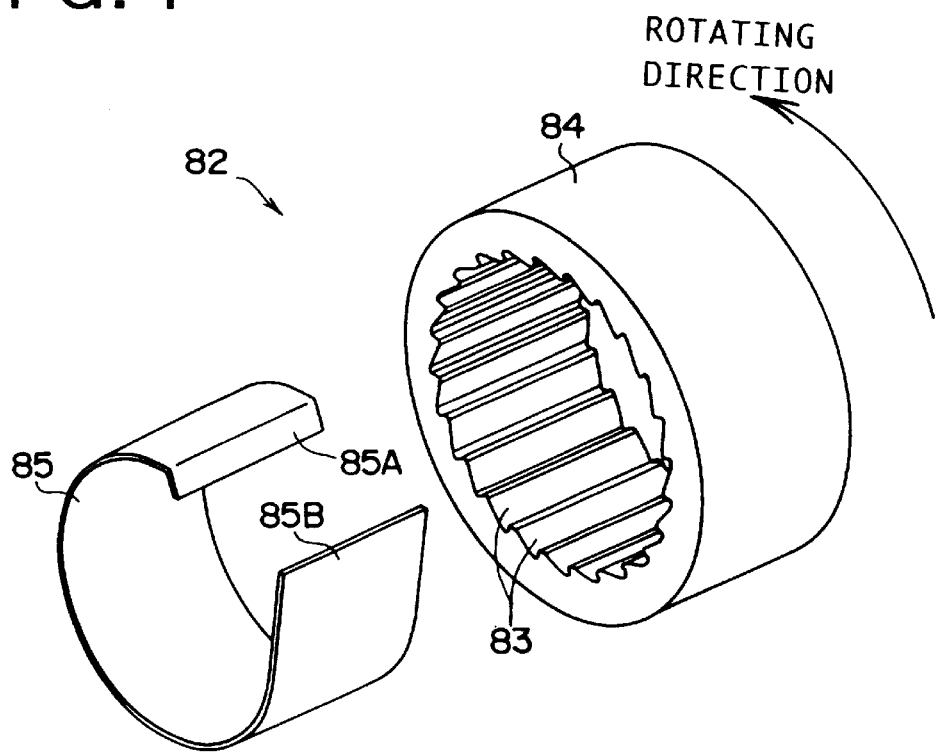
FIG. 4 is an exploded perspective view showing a ratchet system of the aforementioned embodiment.

As shown in FIG. 3 and FIG. 4, the ratchet system 82 includes a ratchet ring 84 secured within the thimble 71 and having a saw-tooth projection 83 on the inner circumferential face thereof. A plate spring 85 is inserted between the ratchet ring 84 and the spindle 61 so the plate spring 85 can be wound on the spindle 61. An inwardly bent end 85A of the plate spring 85 is engaged in the V-shaped groove 62 formed along the axial length of the spindle 61. An outwardly bent end 85B of the plate spring 85 is forcibly pressed into the saw-tooth projection 83 of the ratchet ring 84.

In the structure described thus far, the assembly is carried out by first removing the cap 74 from the cylindrical body 73 of the thimble 71, and then assembling the ratchet system 82, and then placing the ratchet system 82 within the cylindrical body 73. That is to say, after the ratchet ring 84 is prepared, the plate spring 85 is inserted inside of the secured ratchet ring 84.

The cylindrical body 73 assembled with the ratchet system 82 covers the outer circumference of the sleeve 51. The cap nut 72 is then screwed onto the outside of the sleeve 51 to rotatably retain the cylindrical body 73. At the time, the cylindrical body 73 is rotatably retained with a circular adjustment to fit the inwardly bent end 85A of the plate spring 85 into the V-shaped groove 62 of the spindle 61 while looking through the hole of the other end of the cylindrical body 73. After that, the cap 74 is screwed into the cylinder body 73.

In conducting a measurement, for example, when the measured subject (not shown) is held with the left hand and the frame 1 is held with the right hand, provided that the thimble 71 is rotated with the thumb and the index finger of the right hand, the rotation of the thimble 71 is transferred through the ratchet system 82 to the spindle 61. Thereupon the spindle 61 is displaced in the axial direction with the rotation, because the spindle 61 is screwed into the nut member 52 provided to the frame 1. Thereby the digital readout 4 is indicated thereon a measured value in directly readable numerals after the degree of displacement of the spindle 61 is detected by the encoder 41.

At this time, provided that the measured subject is clamped between the anvil 2 and the spindle 61 during the displacement of the spindle 61, the spindle 61 cannot be displaced toward the anvil 2 any more, namely, cannot be rotated in the same direction, so that the ratchet ring 84 is turned free relative to the plate spring 85 of the ratchet system 82. At this time, an indicated value on the digital readout 4 is read, and then the measurement is carried out in the state of a steady measuring pressure.

According to the embodiment, the graduated main scale 25 or the graduated auxiliary scale 26 included in the conventional micrometer, is omitted, so that the outer sleeve 14 for forming the graduated main scale 25 is not needed. As a result, the cost of processing to form the graduated main scale 25 and so on can be reduced and the numbers of parts and processes of the assembly can be also decreased, resulting in the reduction of cost.

The thimble 71 is rotatably provided at the predetermined position in the axial direction of the spindle 61 through the sleeve 51 in the end of the frame I remote from the anvil 2. The rotation transfer means 81 is provided between the thimble 71 and spindle 61, so that, when conducting a measurement, the rotation of the thimble 71 is transferred through the rotation transfer means 81 to the spindle 61 provided that the thimble 71 is rotated, thereby allowing the spindle 61 to be displaced in the axial direction. Thereupon, after the degree of displacement of the spindle 61 is detected by the encoder 41, the digital readout 4 indicates a measured value in directly readable numerals. At the time, although the spindle 61 is displaced in a direction away from the anvil 2, the thimble 71 is not displaced with the spindle 61, because the thimble 71 is rotatably provided at the predetermined position on the frame 1, thereby resolving the disadvantage of decreased operability present with the conventional micrometer, which is caused by the great displacement of the spindle 61.

The rotation transfer means 81 is structured with the ratchet system 82, so that the thimble 71 is rotated free relative to the spindle 61 when the spindle 61 receives more than predetermined load when a measured subject is clamped between the spindle 61 and the anvil 2, thereby allowing the measurement to be carried out with a steady measuring pressure at all times. As a result, high-precision measurement can be insured.

Further, since the ratchet system 82 includes the ratchet ring 84, secured in the thimble 71 with saw-tooth projections 83 on the inner circumferential face of the ratchet ring 84 and the plate spring 85 is inserted between the ratchet ring 84 and the outer circumferential face of the spindle 61, this assembly results in a simple structure with a smaller number of parts, ease of assembly and the reduction of cost. Furthermore, the plate spring 85 is forcibly pressed toward the outside, so that the screw portion 61B of the spindle 61 is not much damaged.

The thimble 71 includes the cylindrical body 73, rotatably supported in the the other end portion of the frame 1, and the cap 74 screwed into the other end portion of the cylindrical body 73, so that the assembly, which the one end 85A of the plate spring 85 in the ratchet system 82 is engaged in the V-shaped groove 62 of the spindle 61, is carried out while looking through the hole of the cylindrical body 73, with the result that the inwardly bent end 85A of the plate spring 85 is easily engaged in the V-shaped groove 62 of the spindle 61. Incidentally, the V-shaped groove 62A also acts as a groove for displacing the spindle 61 in the axial direction while the rotational cylinder 31 is rotated in synchronicity with the spindle 61, so that it is not needed that another groove is formed in order to engage the inwardly bent end 85A of the plate spring 85.

Furthermore, the internal diameter of the cap 74 is designed to be slightly larger than the outer diameter of the spindle 61, thereby the plate spring 85 tries to move in the axial direction with the spindle 61 when the spindle 61 is displaced in the axial direction. However, the cap 74 interrupts the movement of the plate spring 85, therefore the plate spring 85 can be retained at its original position.

In the embodiment described thus far, the ratchet system 82 is used as the rotation transfer means 81, but another structure can be used insofar that the rotation of the thimble 71 is transferred to the spindle 61 and the spindle 61 is allowed to be displaced in the axial direction.

Figure 5:
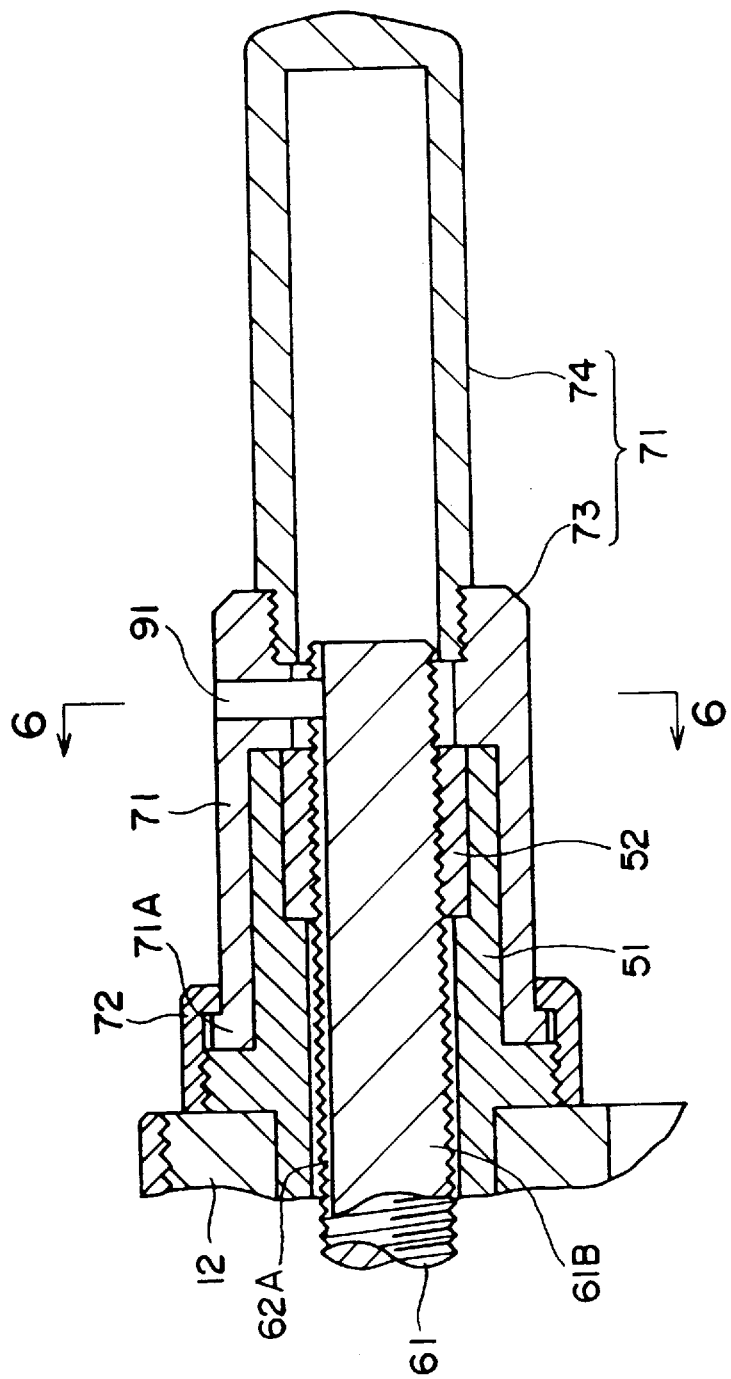
FIG. 5 is a fragmentary enlarged view showing another preferred embodiment of the micrometer according to the present invention.
Figure 6:
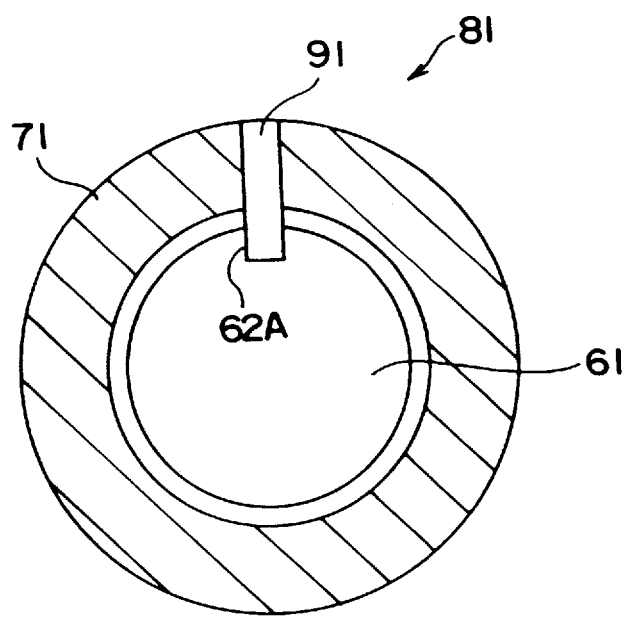
FIG. 6 is a sectional view taken along the 6—6 line in FIG. 5.

For example, as shown in FIG. 5 and FIG. 6, the sectional rectangular groove 62A is formed along the axial direction of the spindle 61, and a pin 91 slidably engaged with the groove 62A can be projected to the inner face of the thimble 71. In the aforementioned structure, the rotation of the thimble 71 is transferred through the pin 91 and the groove 62 to the spindle 61, and the displacement of the spindle 61 in the axial direction can be allowed at the groove 62A engaging the pin 91.

Further, the type of encoder 41 is not limited to the rotary encoder composed of the fixed plate 43 and the rotational plate 44 as described in the aforementioned embodiment. For example, a cylindrical encoder having a coaxial cylindrical encoder (e.g., see Japanese Patent Application No. Hei 6-330689) can be used. Also, rather than using the capacitance encoder, a barrier-layer type or a magnetic type encoder can be used.

According to the micrometer of the present invention, cost can be reduced and the operability can be improved.

What is claimed is:

1. A micrometer, which has a U-shaped frame having an anvil at one end of the frame, a spindle displaced in an axial direction with a screw portion engaging a second end of the frame, an encoder detecting the degree of displacement of the spindle in the axial direction from the degree the spindle is rotated, and a digital readout indicating a measured value in directly readable numerals based on an output signal from the encoder, comprising:

a thimble located at a predetermined position in the axial direction of the spindle against the frame and provided on an outer face of the second end of the frame such that the thimble rotates about the axis of the spindle; and a rotation transfer means provided between the thimble and the spindle, the rotation transferring means transferring the rotation of said thimble to the spindle and allowing the displacement of the spindle in the axial direction.

2. The micrometer according to claim 1, wherein said rotation transfer means is a ratchet system transferring the rotation of said thimble to the spindle and causing said thimble to be rotated free relative to the spindle when the spindle receives more than predetermined load.

3. The micrometer according to claim 2, wherein said ratchet system is composed of a ratchet ring secured in said thimble and having a saw-tooth projection on the inner circumferential face thereof, and a plate spring inserted between said ratchet ring and an outer circumferential face of the spindle in which one end of said plate spring is engaged in a groove formed along the axial direction of the spindle, and a second end is forcibly pressed to the saw-tooth projection of said ratchet ring.

4. The micrometer according to claim 3, wherein said thimble includes a cylindrical body, supported in the second end of the frame to rotate about the axis of the spindle and accommodating said ratchet ring, and a cap screwed into an open end of said cylindrical body and covering an end of the spindle remote from the anvil.

5. The micrometer according to claim 4, wherein said cap has a slightly larger internal diameter than the outer diameter of the spindle and doubles as a stopper to be abutted to an end face of said plate spring when being screwed into the open end portion of said cylindrical body.

6. The micrometer according to claim 4, wherein said cylindrical body has a collar portion at an end thereof, and is retained at the predetermined position in the axial direction of the spindle to rotate about the axis of the spindle by a cap nut screwed onto the outer face of the second end of the frame to cover the collar portion from the outside.

7. The micrometer according to claim 1, wherein said rotation transfer means has a groove formed along the axial direction on an outer circumferential face of the spindle, and a pin engaged to slide in the groove projected to an inner face of said thimble.

8. A micrometer, which as a U-shaped frame having an anvil at one end of the frame, a spindle displaced in the axial direction with a screw portion engaging the second end of the frame, an encoder detecting the degree of displacement of the spindle in the axial direction from the degree the spindle is rotated, and a digital readout indicating a measured value in directly readable numerals based on an output signal from the encoder, comprising:

a thimble located at a predetermined position in the axial direction of the spindle against the frame and provided on an outer face of the second end of the frame such that the thimble rotates about the axis of the spindle; and a rotation transfer means provided between said thimble and the spindle, the rotation transfer means transferring the rotation of said thimble to the spindle and allowing the displacement of the spindle in the axial direction.

9. The micrometer according to claim 8, wherein said rotation transfer means is a ratchet system transferring the rotation of said thimble to the spindle and causing said thimble to be rotated freely relative to the spindle when the spindle receives more than a predetermined load.

10. The micrometer according to claim 9, wherein said ratchet system is composed of a ratchet ring secured in said thimble and having a saw-tooth projection on an inner circumferential face thereof, and a plate spring inserted between said ratchet ring and an outer circumferential face of the spindle, in which one end of said plate spring is engaged in a groove formed along the axial direction of the spindle, and a second end is forcibly pressed against the saw-tooth projection of said ratchet ring.

11. The micrometer according to claim 10, wherein the encoder has a fixed plate with a sending electrode and an output electrode secured in the frame, and a rotational plate having a receiving electrode an associated electrode, the rotational plate being located on the spindle through a rotational cylinder to face the fixed plate with a fixed space, the encoder receiving a signal responding to a relative rotational angle between the fixed plate and the rotational plate from the output electrode when a signal having different phase is given to the sending electrode and wherein the rotational cylinder is screwed with a screw having a projection engaged to slide in the groove formed along the axial direction of the spindle, so that the rotational cylinder and the spindle are synchronously rotated and the displacement of the spindle in the axial direction is allowed.

* * * * *